US012632097B2

(12) United States Patent (10) Patent No.: US 12,632,097 B2
Sakaguchi et al. (45) Date of Patent: May 19, 2026

(54) IMAGE FORMING APPARATUS

(71) Applicant: KYOCERA Document Solutions Inc., Osaka (JP)

(72) Inventors: Shoichi Sakaguchi, Osaka (JP); Fumiya Sakashita, Osaka (JP); Junpei Takada, Osaka (JP); Yumi Hirobe, Osaka (JP); Takuma Fujikawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 79 days.

(21) Appl. No.: 18/705,543

(22) PCT Filed: Jul. 20, 2023

(86) PCT No.: PCT/JP2023/026678
§ 371 (c)(1),
(2) Date: Apr. 27, 2024

(87) PCT Pub. No.: WO2024/024644
PCT Pub. Date: Feb. 1, 2024

(65) Prior Publication Data
US 2025/0021152 A1 Jan. 16, 2025

(30) Foreign Application Priority Data

Jul. 29, 2022 (JP) ................................. 2022-121286

(51) Int. Cl.
*G06F 1/32* (2019.01)
*G06F 1/3231* (2019.01)
*H04N 1/00* (2006.01)

(52) U.S. Cl.
CPC ....... *G06F 1/3231* (2013.01); *H04N 1/00403* (2013.01); *H04N 1/00896* (2013.01)

(58) Field of Classification Search
CPC .............. G06F 1/3231; H04N 1/00403; H04N 1/00896
See application file for complete search history.

(56) References Cited

U.S. PATENT DOCUMENTS 6,577,825 B1 * 6/2003 Gonnella, Jr. ..... G03G 15/5004
399/70
2004/0067073 A1 * 4/2004 Cannon .............. G03G 15/5016
399/81
(Continued)

FOREIGN PATENT DOCUMENTS

JP S5983242 A 5/1984
JP 2009297926 A 12/2009
(Continued)

*Primary Examiner* — Zahid Choudhury
(74) *Attorney, Agent, or Firm* — IP Business Solutions, LLC

(57) ABSTRACT

An image forming apparatus includes a human sensor, a microphone, a receiver, and a controller. In a case where an approaching person is detected by the human sensor when the image forming apparatus is in a power saving state, the controller brings the microphone into a state where a voice input is possible, releases operation mechanisms necessary to execute functions associated with content indicated by a voice instruction received by the receiver from a power saving state and brings the operation mechanisms into an ordinary operation state, and causes operation mechanisms necessary to execute functions that are not associated with the content indicated by the voice instruction to be maintained in the power saving state.

6 Claims, 9 Drawing Sheets

(56)  References Cited

U.S. PATENT DOCUMENTS

| | | | |
|---|---|---|---|
| 2018/0032022 A1* | 2/2018 | Hada ..................... | G03G 15/80 |
| 2018/0321732 A1* | 11/2018 | Fukushi ................ | G06F 3/1204 |
| 2019/0362708 A1 | 11/2019 | Kitaguchi | |
| 2020/0280646 A1 | 9/2020 | Onishi | |
| 2020/0296236 A1* | 9/2020 | Kobayashi ......... | H04N 1/00403 |
| 2022/0264221 A1* | 8/2022 | O ............................ | H04R 1/08 |

FOREIGN PATENT DOCUMENTS

| | | | | | |
|---|---|---|---|---|---|
| JP | 2017028355 | A | | 2/2017 | |
| JP | 2018187848 | A | | 11/2018 | |
| JP | 6521558 | B2 | * | 5/2019 | ......... H04N 1/00408 |
| JP | 2019176250 | A | | 10/2019 | |
| JP | 2019205052 | A | | 11/2019 | |
| JP | 2020098383 | A | | 6/2020 | |
| JP | 2020140559 | A | | 9/2020 | |
| JP | 2021087017 | A | * | 6/2021 | |
| JP | 2024025057 | A | * | 2/2024 | |
| JP | 7456142 | B2 | * | 3/2024 | ......... H04N 1/00037 |

* cited by examiner

| KEYWORD | UI UNIT | SCANNER UNIT | PRINT UNIT | FAX UNIT |
|---------|---------|--------------|------------|----------|
| COPY | ON | ON | ON | OFF |
| SEND | ON | ON | OFF | OFF |
| FAX | ON | ON | OFF | ON |

IMAGE FORMING APPARATUS

TECHNICAL FIELD

The present invention relates to an image forming apparatus that allows voice instructions.

BACKGROUND ART

Some image forming apparatuses such as copy machines and multi-functional machines include operation panels for users to perform manual input operations. A user can select one function from among a plurality of functions (such as a copy function, a scanner function, and a facsimile function, for example) and perform setting for the function by performing operations via the operation panels.

Also, various image forming apparatuses that allow voice instructions have been proposed and put into practical use. For example, Patent Literature 1 listed below describes that content of a voice instruction is reflected in job setting, and Patent Literature 2 listed below describes that job history information intended by a user is narrowed down from a plurality of pieces of job history information on the basis of a keyword included in user voice.

CITATION LIST

Patent Literature

[Patent Literature 1]
  Japanese Unexamined Patent Application No. 2020-098383
[Patent Literature 2]
  Japanese Unexamined Patent Application No. 2019-205052

SUMMARY OF INVENTION

Some image forming apparatuses can set a power saving mode in which operation mechanisms in the image forming apparatuses are brought into a power saving state. Also, microphones used for voice inputs for voice instructions are brought into an ON state in a case where persons are detected by human sensors, for example. Once the microphones are brought into the ON state when persons pass in front of the image forming apparatuses, the power saving mode is released, and the operation mechanisms of the image forming apparatuses are returned from the power saving state to a state where ordinary operations are possible. However, it is not preferable to return all the operation mechanisms of the image forming apparatuses from the power saving state to the state where the ordinary operations are possible in a situation in which only persons have been detected by the human sensors and which functions of the image forming apparatuses the persons will use are not yet sure, in terms of a viewpoint that it is desired to efficiently realize power saving. Patent Literatures 1 and 2 listed above do not disclose means for addressing such a problem and realizing efficient power saving.

The present invention was made in view of the above circumstances, and an object thereof is to realize efficient power saving when an image forming apparatus is caused to recover from a power saving state.

An image forming apparatus according to an aspect of the present invention includes: an image forming device that forms an image and performs printing on a recording paper: a human sensor that detects a person approaching the image forming apparatus: a voice input device that receives an input of voice from a user; a receiver that receives a voice instruction based on the voice input to the voice input device; and a controller that executes a job in accordance with content of the voice instruction received by the receiver and brings a plurality of operation mechanisms provided in the image forming apparatus into a predefined power saving state, in which in a case where the approaching person is detected by the human sensor when the image forming apparatus is in the power saving state, the controller brings the voice input device into a state where a voice input is possible, releases the operation mechanisms necessary to execute functions associated with content indicated by the voice instruction received by the receiver from the power saving state and brings the operation mechanisms into an ordinary operating state, and causes the operation mechanisms necessary to execute functions that are not associated with the content indicated by the voice instruction to be maintained in the power saving state.

According to the present invention, it is possible to realize efficient power saving when an image forming apparatus is caused to recover from a power saving state.

BRIEF DESCRIPTION OF DRAWINGS

FIG. 6 is a diagram illustrating an example of relationships between keywords uttered by a user and units to be released from a power saving state.

DESCRIPTION OF EMBODIMENTS

Figure 1:
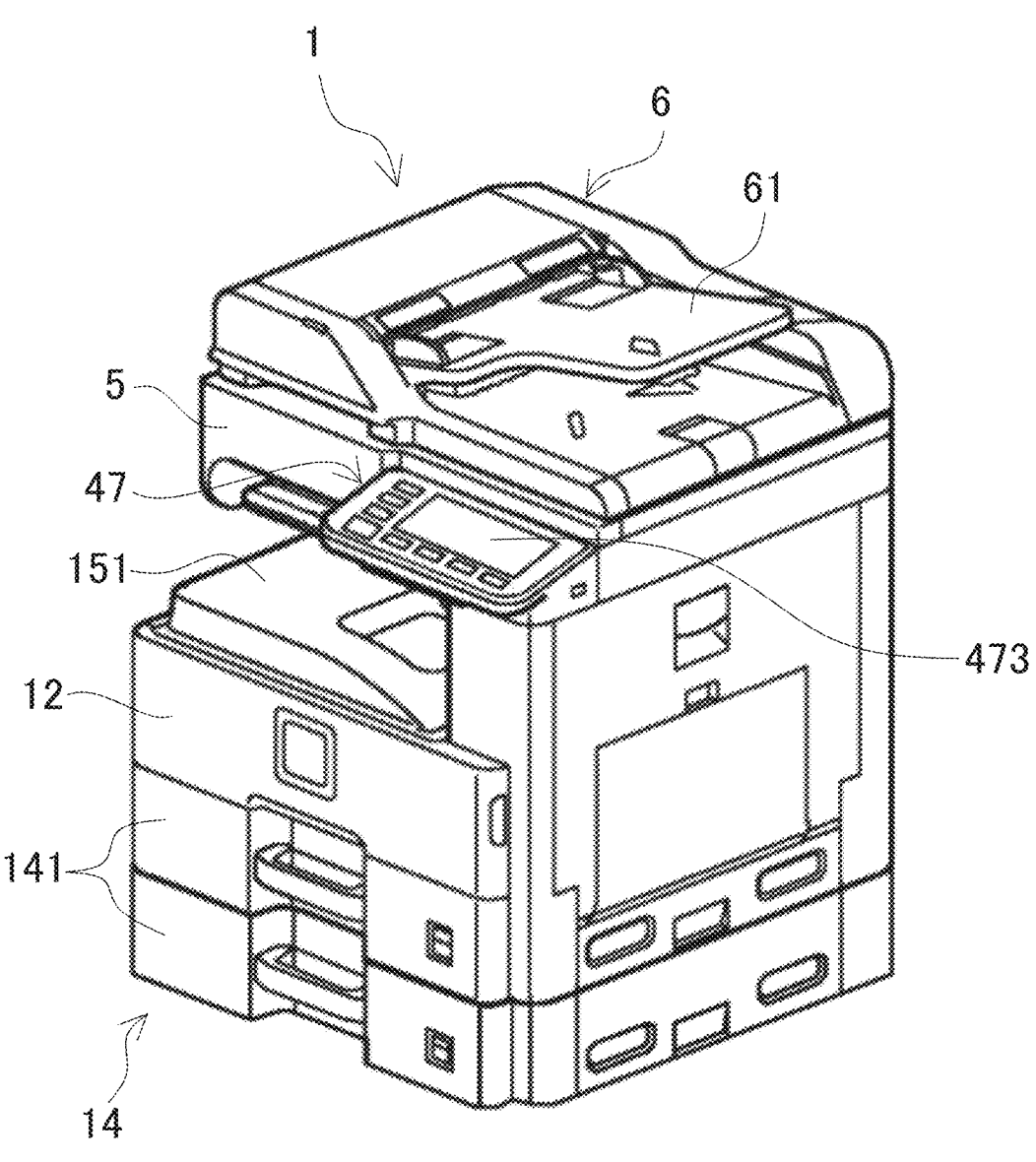
FIG. 1 is a perspective view illustrating the exterior of an image forming apparatus according to an embodiment of the present invention.
Figure 2:
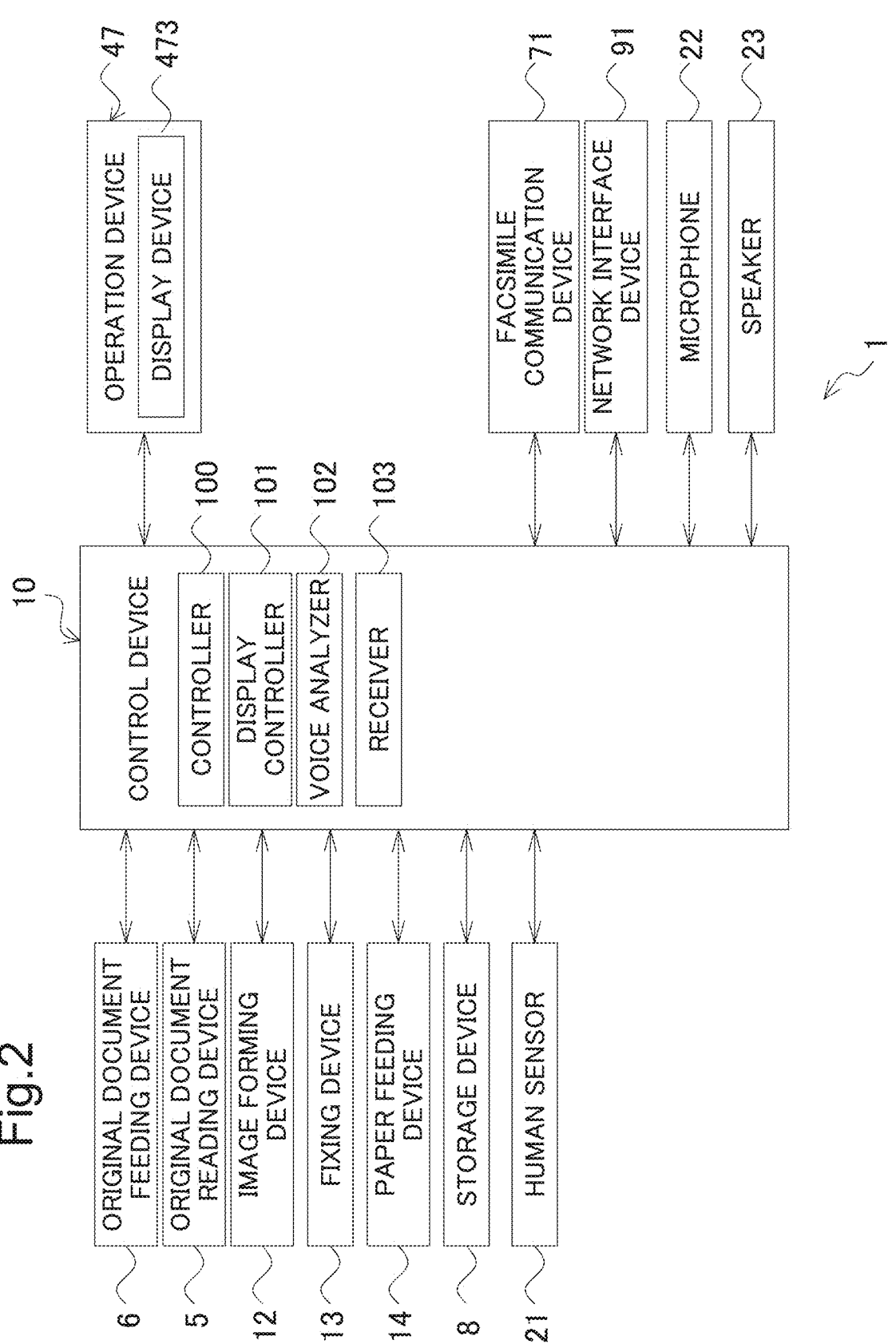
FIG. 2 is a functional block diagram schematically illustrating main internal configurations of the image forming apparatus.

Hereinafter, an image forming apparatus according to an embodiment of the present invention will be described with reference to the drawings. FIG. 1 is a perspective view illustrating the exterior of the image forming apparatus according to the embodiment of the present invention. FIG. 2 is a functional block diagram schematically illustrating main internal configurations of the image forming apparatus. An image forming apparatus 1 according to a first embodiment is a multi-function machine that is equipped with a plurality of functions such as a copy function, a printer function, a scanner function, and a facsimile function, for example, and is configured to include an original document feeding device 6, an original document reading device 5, an image forming device 12, a fixing device 13, a paper feeding device 14, a storage device 8, a human sensor 21, an operation device 47, a facsimile communication device 71, a network interface device 91, a microphone 22, and a speaker 23.

An original document feeding device 6 is configured on an upper surface of the original document reading device 5 such that the original document feeding device 6 can be opened and closed with a hinge, which is not illustrated, and the original document feeding device 6 functions as an original document pressing cover in a case where an original document placed on a platen glass, which is not illustrated, is read. Also, the original document feeding device 6 is called an auto document feeder (ADF) or a document processor (DP), includes an original document placement tray 61, and supplies an original document placed on the original document placement tray 61 one by one to the original document reading device 5.

A case where the image forming apparatus 1 performs an original document reading operation will be described. The original document reading device 5 optically reads an image in the original document supplied to the original document reading device 5 by the original document feeding device 6 or the original document placed on the platen glass and generates image data. The image data generated by the original document reading device 5 is saved in an image memory or the like, which is not illustrated.

A case where the image forming apparatus 1 performs an image forming operation will be described. The image forming device 12 forms a toner image on a recording paper as a recording medium supplied from the paper feeding device 14 on the basis of the image data generated by the original document reading operation or image data received from a computer as an external device (a personal computer, for example) connected via a network.

The fixing device 13 is adapted to heat and pressurize the recording paper with a toner image formed thereon by the image forming device 12 and fix the toner image on the recording paper, and the recording paper on which fixation processing has been performed is discharged to a discharge tray 151. The paper feeding device 14 includes a plurality of paper supply cassettes 141.

The storage device 8 is a large-capacity storage device such as a hard disk drive (HDD) or a solid state drive (SSD) and stores various control programs and the like.

The human sensor 21 detects a person approaching the image forming apparatus 1. As the human sensor 21, a sensor that detects infrared rays emitted from a human body, for example, is used.

The operation device 47 receives instructions such as an image forming operation executing instruction from an operator who is a user in regard to various operations and processing that can be performed by the image forming apparatus 1. The operation device 47 includes a display device 473 that displays an operation guide and the like for the operator. Also, the operation device 47 receives inputs of instructions from a user on the basis of operations (touch operations) performed by the user on an operation screen displayed on the display device 473 via a touch panel included in the display device 473 and operations performed by the user on physical keys.

The display device 473 is configured of a liquid crystal display (LCD) or the like. The display device 473 includes a touch panel. Once the operator performs an operation of touching a button or a key displayed on the screen, an instruction corresponding to the position where the touch operation has been performed is received by the touch panel.

The facsimile communication device 71 includes encoding/decoding and modulation/demodulation devices and a network control unit (NCU), which are not illustrated, and performs facsimile transmission/reception by using a public telephone network or the like.

The network interface device 91 is a communication interface that transmits/receives various kinds of data to and from an external device (a personal computer, for example) in a local area or on the Internet.

The microphone 22 is a voice input device that collects sound in the surroundings of the image forming apparatus 1 and converts the sound into an electrical signal (voice data). Note that the microphone 22 is provided at an appropriate location where it is easy to collect voice of an utterance of the user, for example, in the operation device 47.

The speaker 23 outputs various kinds of voice such as operation sounds and effect sounds when the operation device 47 is operated, guidance voice for explaining an operation method, and an alert sound in a case where some trouble occurs in the image forming apparatus 1. For example, the speaker 23 is provided at a location where the speaker 23 is not visible from the outside of the image forming apparatus 1, for example, inside the operation device 47.

The control device 10 is configured to include a processor, a random access memory (RAM), a read only memory (ROM), and a dedicated hardware circuit. The processor is, for example, a central processing unit (CPU), an application specific integrated circuit (ASIC), or a micro processing unit (MPU). The control device 10 includes a controller 100, a display controller 101, a voice analyzer 102, and a receiver 103.

The control device 10 is adapted to function as the controller 100, the display controller 101, the voice analyzer 102, and the receiver 103 by operations of the processor in accordance with a control program stored in the storage device 8. However, each of the controller 100 and the like can also be configured by a hardware circuit without depending on operations in accordance with the control program of the control device 10. Hereinafter, the same applies to each embodiment unless otherwise particularly stated.

The controller 100 is in charge of overall operation control of the image forming apparatus 1. The controller 100 is connected to the original document feeding device 6, the original document reading device 5, the image forming device 12, the fixing device 13, the paper feeding device 14, the storage device 8, the human sensor 21, the operation device 47, the facsimile communication device 71, the network interface device 91, the microphone 22, and the speaker 23 and performs drive control and the like on each of these components. For example, the controller 100 controls operations of the image forming device 12 and the like and causes an original document image obtained by the original document reading device 5 through reading to be formed on recording paper as a recording medium.

Also, once an approaching person is detected by the human sensor 21, the controller 100 controls the microphone 22 to bring the microphone 22 into an ON state to enable a voice input to the microphone 22, and if a predefined time (30 seconds, for example) elapses after the approaching person is no longer detected by the human sensor 21, the controller 100 controls the microphone 22 and brings the microphone 22 into an OFF state. Note that the ON/OFF switching of the microphone 22 can also be performed by the controller 100 in accordance with an instruction input to the operation device 47.

Also, the controller 100 brings the microphone 22 into an ON state to achieve a state where a voice input is possible when an approaching person is detected by the human sensor 21.

The display controller 101 controls display operations of the display device 473. For example, the display controller 101 displays, on the display device 473, a selection screen for allowing the user to select a function to be executed from among the plurality of functions that can be executed by the image forming apparatus 1 and displays, on the display device 473, a setting screen for receiving an input related to setting for each function which is a lower layer than the selection screen.

Figure 3A:
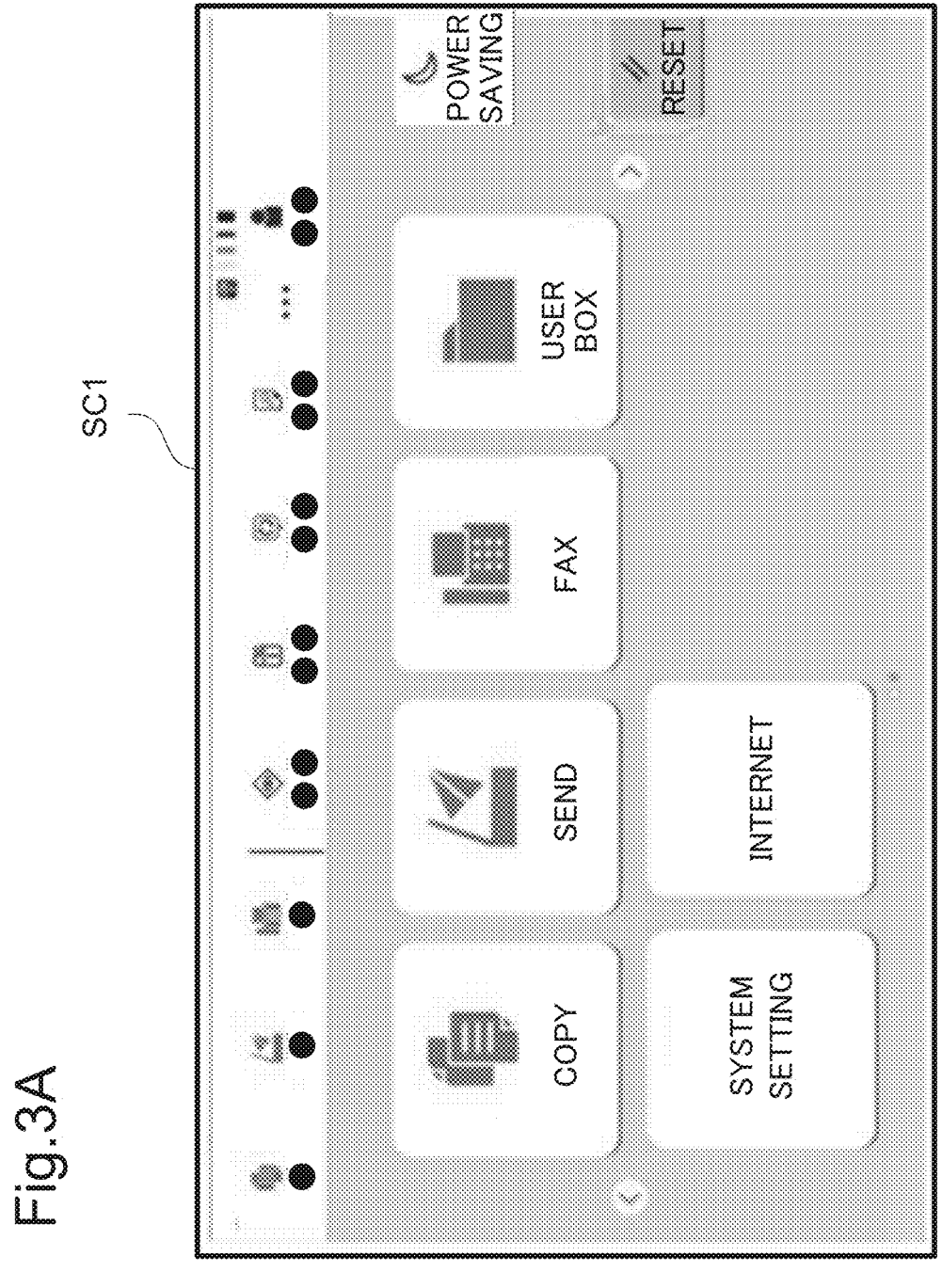
FIGS. 3A and 3B are diagrams illustrating an example of an operation screen displayed on a display device.
Figure 3B:
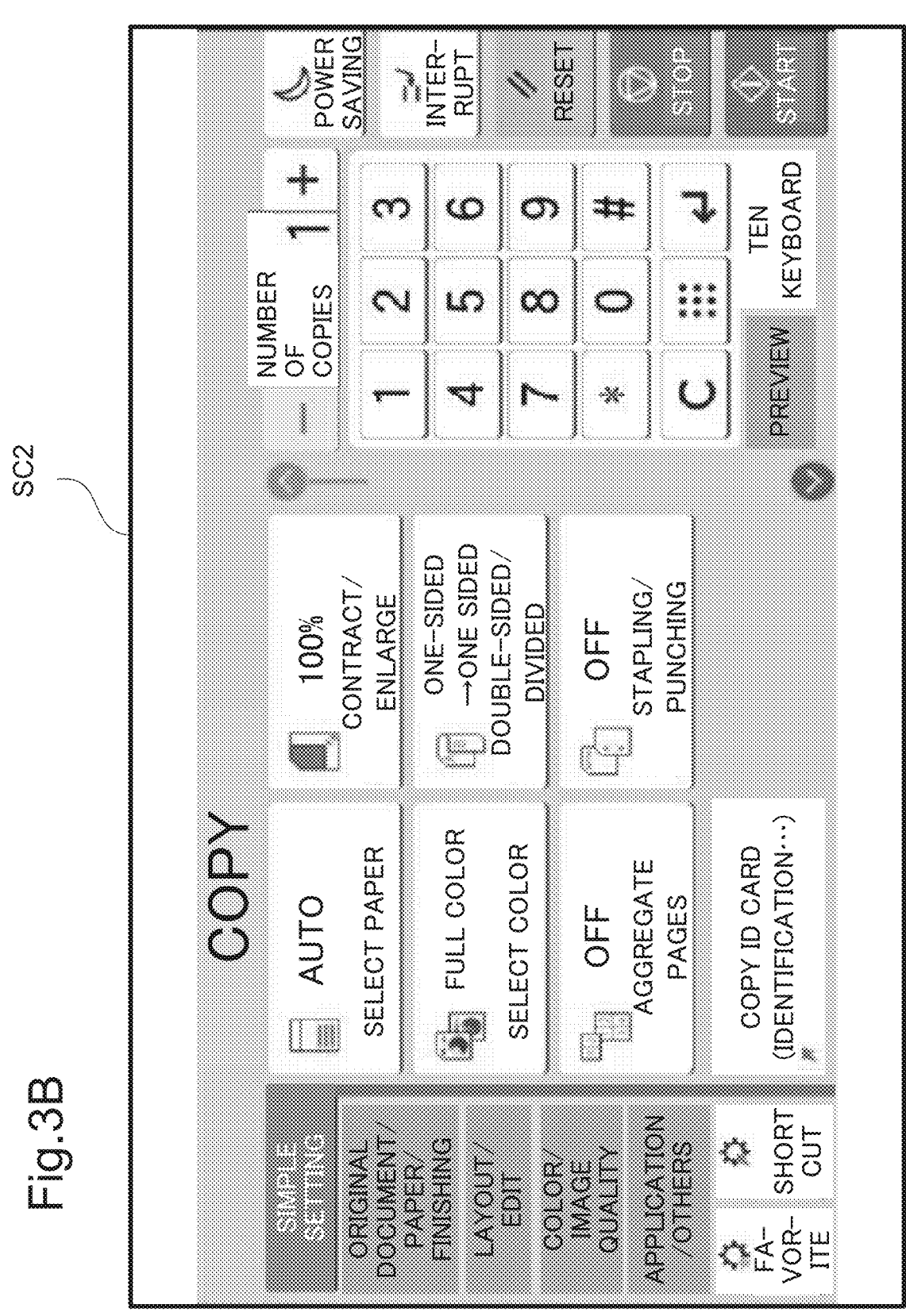

FIGS. 3A and 3B are diagrams illustrating examples of a screen displayed on the display device 473. An operation screen SC1 illustrated in FIG. 3A is a selection screen for allowing the user to select a function to be executed from among the plurality of functions that can be executed by the image forming apparatus 1. On the operation screen SC1, a "copy" button, a "send (scanner function)" button, a "fax (facsimile function)" button, and the like are displayed. Note that the operation screen SC1 of the above selection screen is also a home screen. Once the "copy" button is pressed by the user, the operation device 47 receives a copy function selection instruction, and the controller 100 causes the display device 473 to display an operation screen SC2 illustrated in FIG. 3B in response to the instruction.

The operation screen SC2 is displayed as a lower hierarchy than the "home" screen on the display device 473. The operation screen SC2 is a setting screen for receiving an input related to setting of the "copy" function. Six buttons with descriptions of "Select paper", "Select color", "Aggregate pages", "Contract/Enlarge", "Double-sided/Divided", and "Stapling/Punching" are displayed at the center of the setting screen for the "copy" function. These buttons are images for receiving settings related to the "copy" function.

Also, a button for receiving designation of favorite registration settings in which setting values that are different from default values are registered in advance is displayed below the above six buttons on the operation screen SC2. A description of "Copy ID card", for example, is applied to the button. "Copy ID card" is a function used when it is desired to copy both front and rear sides of an ID card such as a driver's license card or an insurance card side by side on one sheet of recording paper. Setting values that are different from default values such as "A6 (select paper)", "Color (Select color)", "2 in 1 (Aggregate pages)", "A6 (Original document size)", "Not set (Successive reading)", "Set (Erase outside of original document region)", and "Outer frame: 1 mm (Erase frame)" are registered in advance as settings for the "copy" function in the "Copy ID card". Therefore, once the user presses the "Copy ID card" button, an instruction to reflect the setting values that are different from the default in the copy function is input to the operation device 47 and is further received by the receiver 103.

The voice analyzer 102 converts the electrical signal (voice data) converted by the microphone 22 into text data by using an existing voice recognition technique, analyzes the text data by using an existing natural language processing technique, and thereby recognizes the voice instruction from the user.

The receiver 103 receives, as instructions from the user, the instruction input by a manual input operation via the operation device 47 (including a touch panel) on the screen that is currently displayed on the display device 473 and the voice instruction (an analysis result of the voice analyzer 102) recognized by the voice analyzer 102 via the microphone 22. The controller 100 executes a job in accordance with content of the instructions received by the receiver 103.

Figure 4:
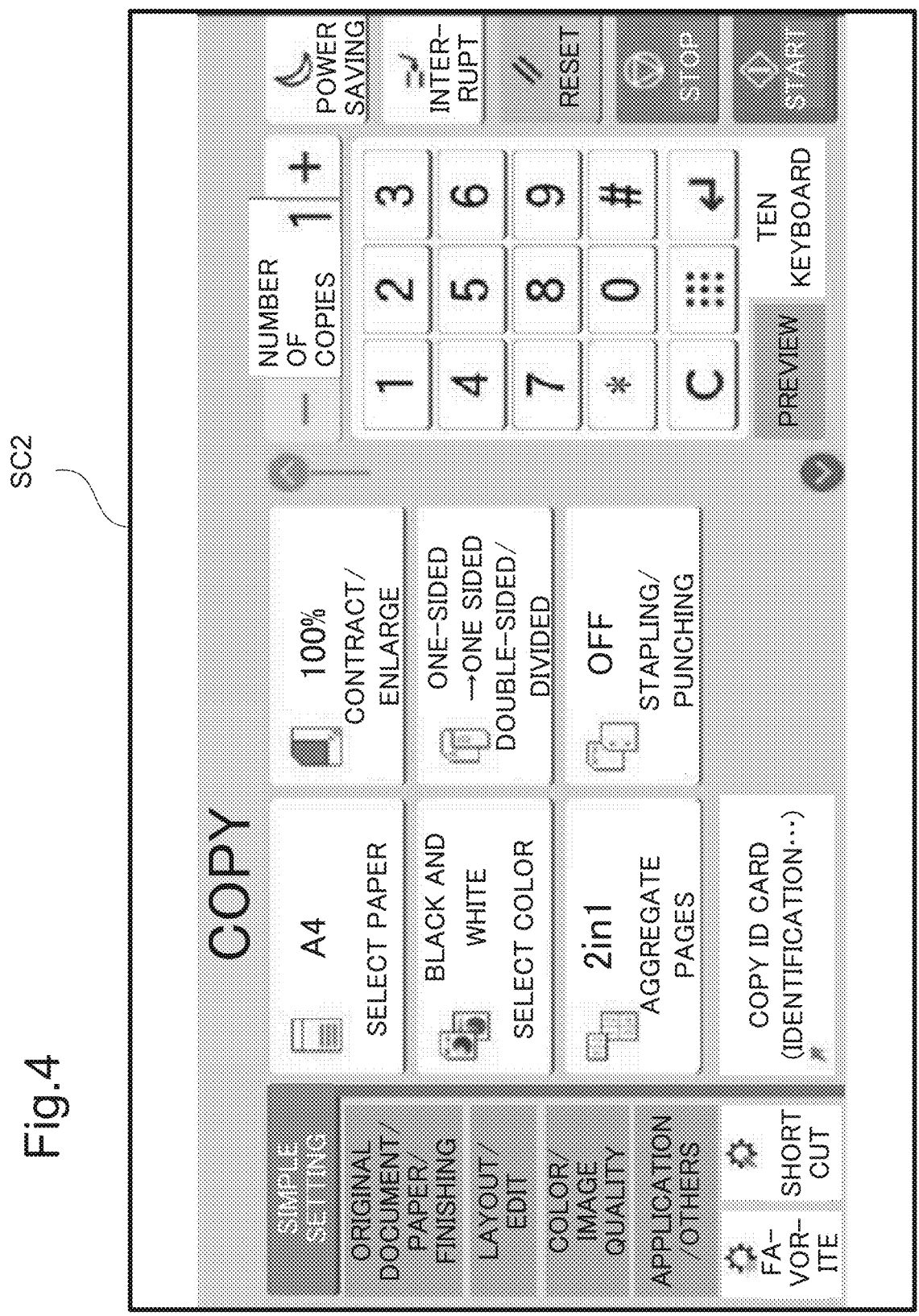
FIG. 4 is a diagram illustrating an example of the operation screen displayed on the display device.

The display controller 101 displays, on the display device 473, a setting screen displaying content indicated by the instruction input by a manual input operation or the above voice instruction. For example, when the operation screen SC2 of the setting screen illustrated in FIG. 3B is displayed on the display device 473, the user inputs instructions to set "Select paper" to "A4", "Select color" to "Black and white", and "Aggregate pages" to "2 in 1" via the operation device 47, and the receiver 103 receives the instructions. At this time, the display controller 101 displays, on the display device 473, the operation screen SC2 (setting screen) that displays, in a switched manner, the setting for "Select paper" from "Auto" to "A4", the setting for "Select color" from "Full color" to "Black and white", and the setting for "Aggregate pages" from "Off" to "2 in 1" as illustrated in FIG. 4A.

Figure 5:
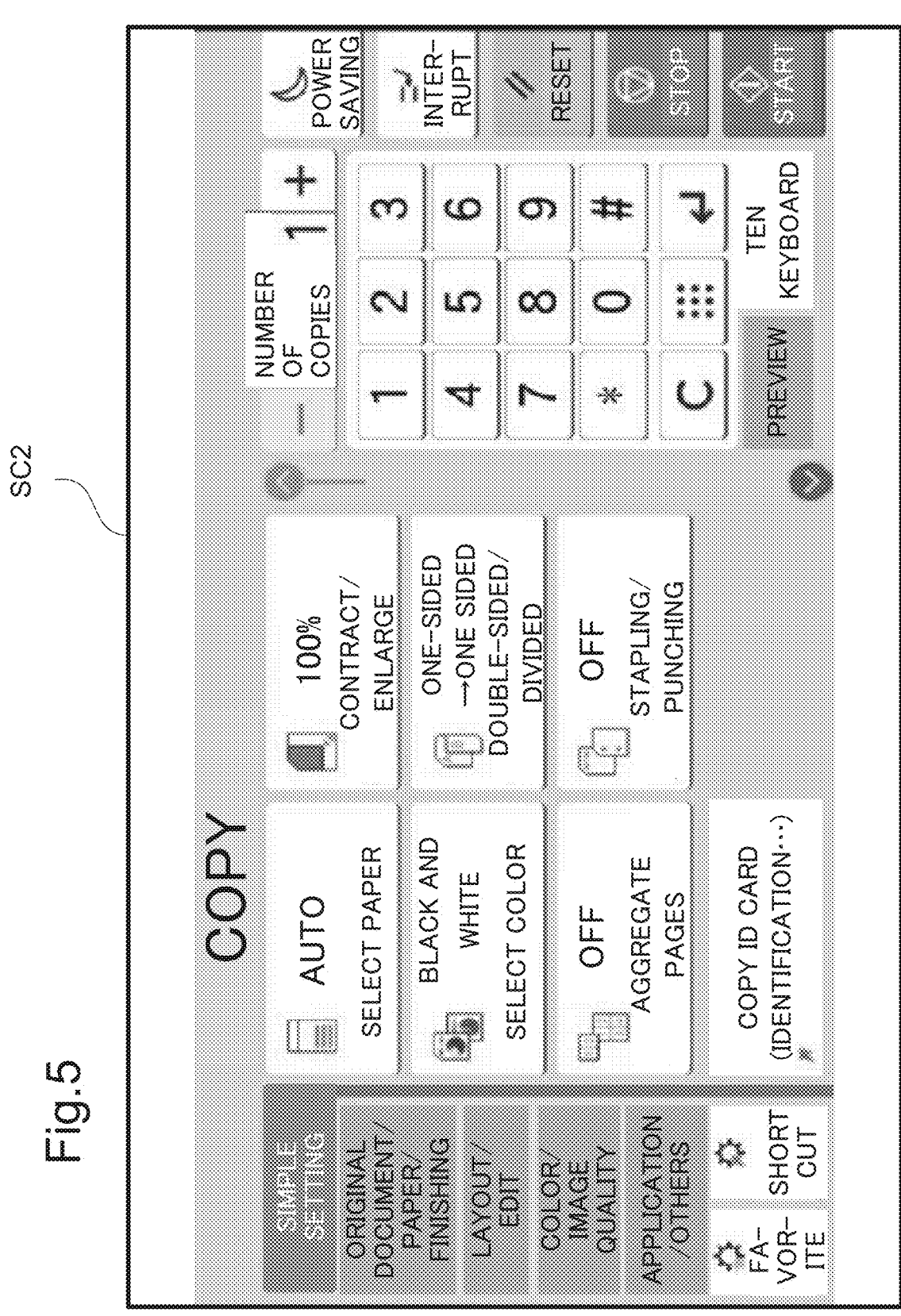
FIG. 5 is a diagram illustrating an example of the operation screen displayed on the display device.

If the user utters the keyword "black and white copy" when the operation screen SC1 illustrated in FIG. 3A is displayed on the display device 473, a voice instruction of setting a setting value to "black and white copy" is received by the receiver 103 via the speaker 23 and the voice analyzer 102. In other words, if the voice instruction is input to the speaker 23 and the voice instruction is received by the receiver 103 via the voice analyzer 102 when the display device 473 is caused to display the operation screen SC1 that is the selection screen, the display controller 101 causes the display screen on the display device 473 to transition from the operation screen SC1 that is the selection screen to the operation screen SC2 that is the setting screen to receive inputs of the setting values indicated by the voice instructions. Furthermore, the display controller 101 causes the operation screen SC2 to display the setting value indicated by the received voice instruction, "black and white copy" in this case as illustrated as an example in FIG. 5. Note that information regarding which of the functions each setting screen corresponds to and what kinds of setting value inputs each setting screen is adapted to receive is held in advance in a memory incorporated in the control device 10, for example, by an operation based on the control program. The display controller 101 specifies a setting screen for receiving inputs of setting values indicated by the voice instructions on the basis of the information.

Also, the controller 100 performs control of bringing a plurality of operation mechanisms provided in the image forming apparatus 1 into a predefined power saving state. The predefined power saving state means bringing the operation mechanisms into a sleep state in which power consumption is minimized as much as possible rather than a standby state where the operation mechanism can immediately operate. The above operation mechanisms are, for example, a user interface (UI) unit, a scanner unit, a print (image formation) unit, and a facsimile unit. The UI unit is an operation mechanism including the operation device 47. The scanner unit is an operation mechanism including the original document reading device 5. The print unit is an operation mechanism including the image forming device 12 and the fixing device 13. The facsimile unit is an operation mechanism including the facsimile communication device 71.

In a case where an approaching person is detected by the human sensor 21 when the image forming apparatus 1 is in the power saving state, the controller 100 brings the microphone 22 into a state where a voice input is possible, releases operation mechanisms necessary to execute functions associated with content indicated by the voice instruction received by the receiver 103 from the power saving state and brings the operation mechanisms into an ordinary operation state, and causes operation mechanisms necessary to execute functions that are not associated with the content indicated by the voice instruction to be maintained in the power saving state.

In a case where the receiver 103 receives a voice instruction including the keyword "copy", for example, the controller 100 releases the power saving state of the UI unit, the scanner unit, and the print unit stored in advance in association with the copy function that is content indicated by the voice instruction. On the other hand, the controller 100 does not release the power saving state of the facsimile unit that is not stored in advance in association with the copy function and maintains the power saving state as it is at this time.

FIG. 6 is a diagram illustrating an example of relationships between keywords uttered by a user and included in voice instructions and operation mechanisms to be released from the power saving state. In FIG. 6, units to be released from the power saving state and brought into the ordinary operation state where ordinary operations are possible are described as "ON", while units that are not to be released from the power saving state are described as "OFF". In regard to the keywords illustrated in FIG. 6, "Copy" corresponds to a copy function, "Send" corresponds to a transmission function, and "Fax" corresponds to a facsimile function. In other words, FIG. 6 illustrates a relationship between each function that can be executed by the image forming apparatus 1 and operation mechanisms associated with each function and to be released from the power saving state.

Also, the receiver 103 receives a voice instruction for the above favorite registration setting registered in advance. In a case where a user utters the key code "copy an ID card" and the receiver 103 receives a voice instruction related to copying of an ID card via the microphone 22 and the voice analyzer 102, or in a case where a "Copy ID card" button is pressed by the user and a manual input instruction is received via the operation device 47, for example, setting for the copy function with content (setting values) registered in advance as favorite registration setting for the copying of an ID card is received.

In a case where the receiver 103 receives a voice instruction for the favorite registration setting when the image forming apparatus 1 is in the power saving state, the controller 100 also releases the power saving state of the operation mechanisms necessary to execute functions for which setting is performed on the basis of the favorite registration setting indicated by the voice instruction and brings the operation mechanisms into the ordinary operation state, and causes the other operation mechanisms that are not necessary to execute the function to be maintained in the power saving state.

Figure 7:
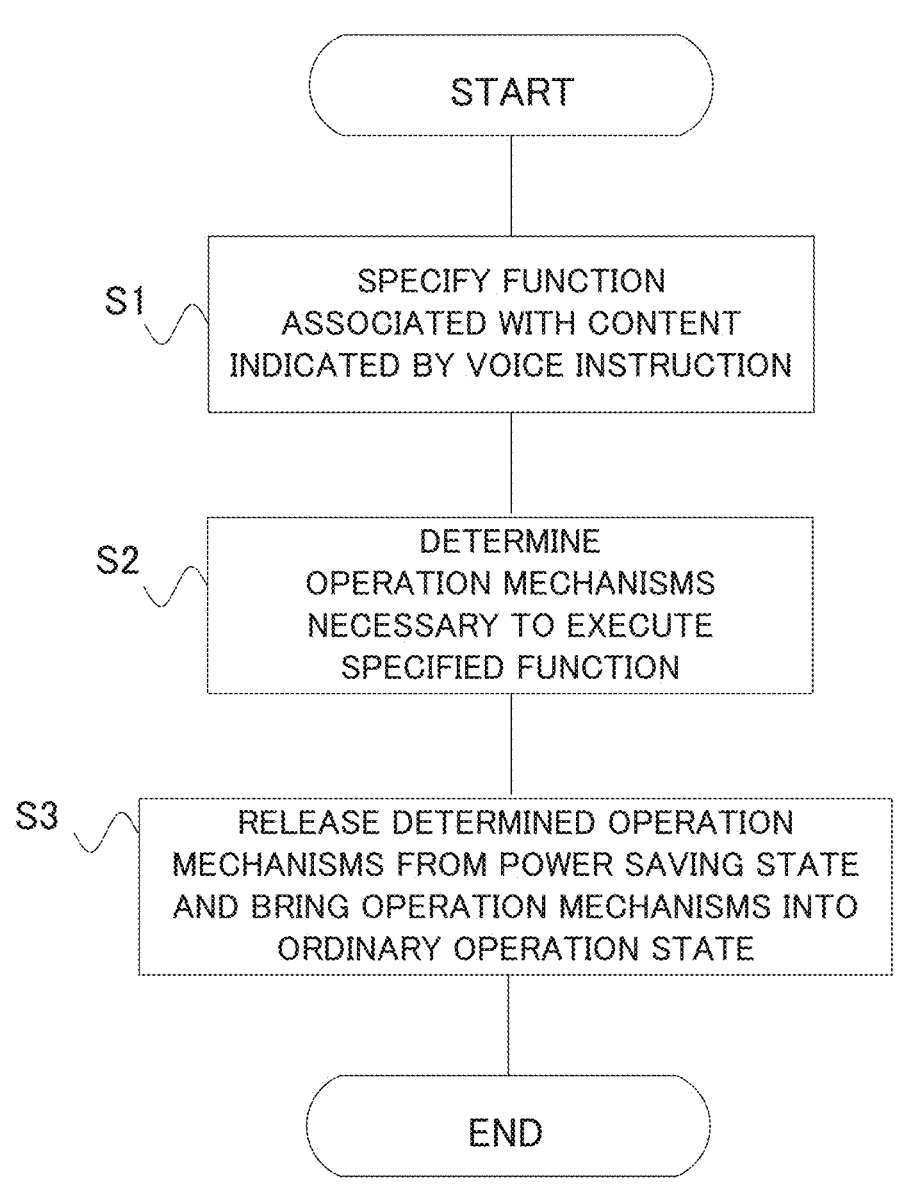
FIG. 7 is a flowchart illustrating an example of processing performed by a control device in the image forming apparatus.

Next, an example of processing performed by the control device 10 in the image forming apparatus 1 will be described on the basis of the flowchart illustrated in FIG. 7. Note that the processing is processing performed when an approaching person is detected by the human sensor 21 in a state where the image forming apparatus 1 is in the power saving state, the controller 100 brings the microphone 22 into an ON state and enables a voice input to the microphone 22, and a voice instruction is received by the receiver 103 via the microphone 22 and the voice analyzer 102.

The controller 100 specifies a function associated with content indicated by the voice instruction received by the receiver 103 (S1). Then, the controller 100 determines operation mechanisms necessary to execute the specified function (S2). The controller 100 releases the determined operation mechanisms from the power saving state and brings the operation mechanisms into an ordinary operation state (S3). At this time, the controller 100 causes operation mechanisms necessary to execute functions that are not associated with the content indicated by the voice instruction, that is, operation mechanisms other than the determined operation mechanisms, to be maintained in the power saving state.

In this manner, according to the above embodiment, the power saving state of the image forming apparatus 1 is not completely released, and only the power saving state of units necessary to execute the functions associated with the content of the voice instruction is released, in a case where the voice instruction is given by the user when the power saving mode is set. In other words, the operation mechanisms to execute the functions that are not associated with the voice instruction input by the user are maintained in the power saving state. Therefore, according to the above embodiment, it is possible to realize efficient power saving when the image forming apparatus 1 is caused to recover from the power saving state.

Here, modification examples of the above embodiment will be described. If the user utters the keyword "black and white copy" when the operation screen SC1 illustrated in FIG. 3A is displayed on the display device 473, for example, the voice instruction is received by the receiver 103 via the microphone 22 and the voice analyzer 102, and the controller 100 can specify a function associated with content indicated by the voice instruction as the copy function.

However, in a case where the user utters the keyword "2 in 1" and the voice instruction is received by the receiver 103 when the operation screen SC1 is displayed on the display unit 473, "2 in 1" indicated by the voice instruction is common to a plurality of functions, namely the copy function, the scanner function, and the facsimile function, and therefore the controller 100 cannot narrow down the functions associated with the content indicated by the voice instruction into one function and specify the one function.

Thus, in a case where the content of the voice instruction received by the receiver 103 is associated with a plurality of functions, the controller 100 releases the operation mechanisms necessary to execute the plurality of functions from the power saving state and brings the operation mechanisms into an ordinary operation state, and causes the operation mechanisms that are not necessary to execute the plurality of functions to be maintained in the power saving state. In the case where the user utters the keyword "2 in 1" and the voice instruction is received by the receiver 103 via the microphone 22 and the voice analyzer 102, for example, the power saving state of the UI unit, the scanner unit, and the print unit necessary to execute all the functions associated with the voice instruction is released, and they are brought into the ordinary operation state.

Yet another modification example of the above embodiment will be described. Although the controller 100 is adapted such that when an approaching person is detected by the human sensor 21 in a state where the image forming apparatus 1 is in the power saving state, the controller 100 brings the microphone 22 into an ON state in the above embodiment, the controller 100 may instead bring the microphone 22 into the ON state to achieve the state where a voice input is possible in a case where a condition that the detection of the approaching person has continued for a predefined period of time (30 seconds, for example) is satisfied in addition to the condition that the approaching person is detected by the human sensor 21. In this case, it is possible to adapt the receiver 103 not to receive a voice instruction even if the approaching person who just passes by the image forming apparatus 1 without operating the image forming apparatus 1 is detected by the human sensor 21, and it is thus possible to adapt the receiver 103 not to receive an inaccurate voice instruction due to noise or the like input to the microphone 22.

In yet another embodiment, when state information indicating that a state of any mechanism part included in the image forming apparatus 1 has changed is acquired, the controller 100 may perform control of releasing an operation mechanism necessary to execute a function for which the mechanism part is used from the power saving state and bringing the operation mechanism into the ordinary operation state, and causing the operation mechanisms that are not necessary to execute the function for which the mechanism part is used to be maintained in the power saving state, in addition to the above control.

Figure 8:
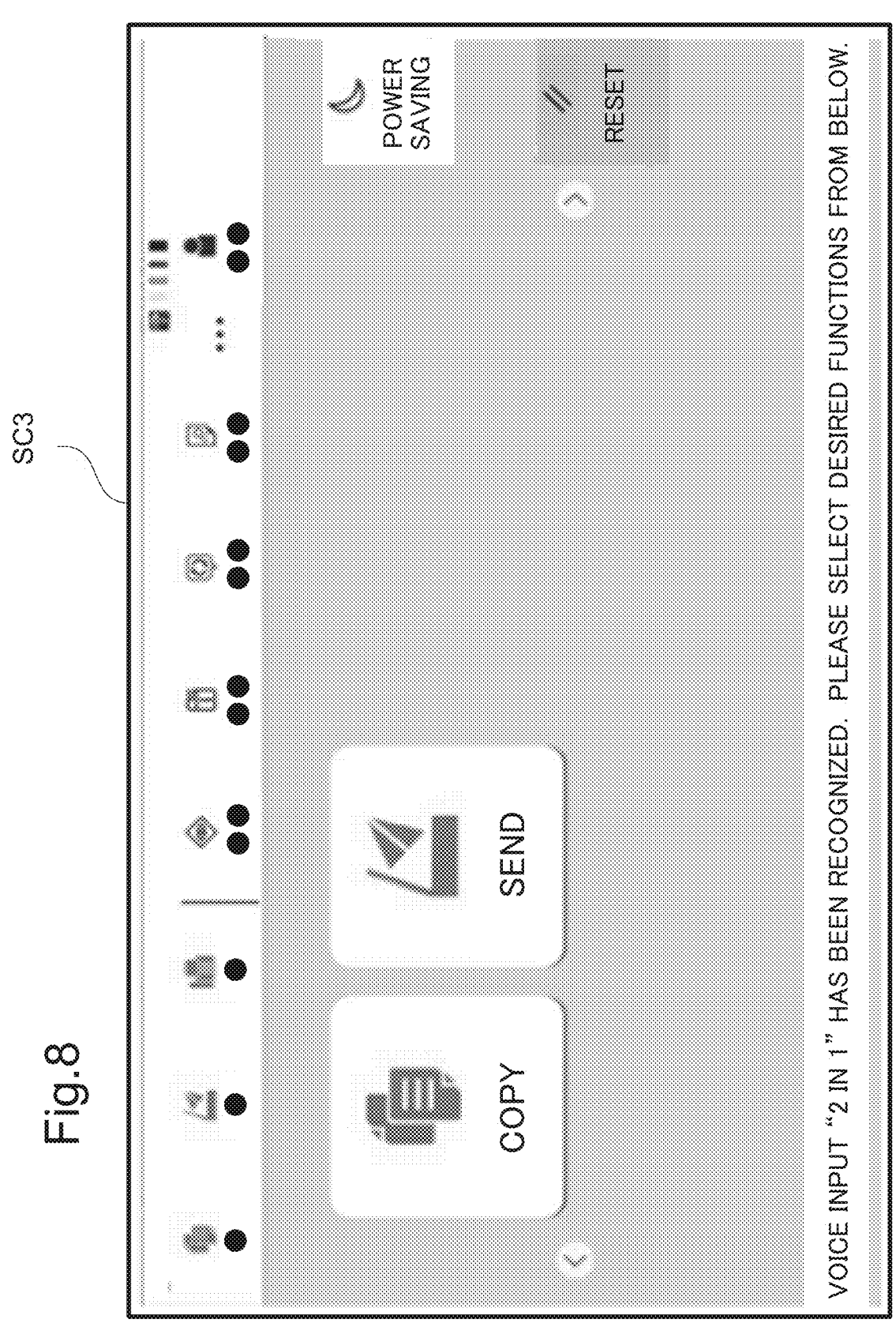
FIG. 8 is a diagram illustrating an example of the operation screen displayed on the display device.

For example, the controller 100 is adapted such that in a case where opening/closing detection information is acquired from an opening/closing switch which detects opening/closing of the original document feeding device 6 and is not illustrated and the opening/closing detection information indicates "open" when the approaching person is detected by the human sensor 21 in a state where the image forming apparatus 1 is in the power saving state, the controller 100 specifies the transmission function and the copy function associated in advance with the "open" information, and the display controller 101 causes the display device 473 to display an operation screen SC3 (an example of which is illustrated in FIG. 8) to receive an input of a selection instruction to select which of the transmission function and the copy function is to be executed. At this point, the controller 100 may release the operation mechanisms necessary to execute the transmission function and the copy function from the power saving state and bring the operation mechanisms into the ordinary operation state, or further, the controller 100 may not release the operation mechanisms necessary to execute the transmission function and the copy function from the power saving state and bring the operation mechanisms into the ordinary operation state at this point and may release the operation mechanisms necessary to execute functions selected by a selection instruction from the power saving state and bring the operation mechanisms into the ordinary operation state when the selection instruction indicating which of the transmission function and the copy function is to be executed is received through the voice instruction or the manual input instruction by the receiver 103.

Note that although the case where voice data collected by the microphone 22 and converted is analyzed by the voice analyzer 102 in the image forming apparatus 1 has been described hitherto, a speaker that is called a smart speaker, incorporates a microphone therein, and has an artificial intelligence (AI) assistant function may be employed, user's voice may be collected by the speaker, and the image forming apparatus) 1 may use the speaker as a voice input device and receive, by the receiver 103, a voice analysis result from the speaker as setting values in a further embodiment.

The present invention is not limited to the configurations of the above embodiments, and various modifications can be made. Also, in regard to the above embodiments, the configurations and the processing illustrated in the embodiments by using FIGS. 1 to 8 are only some embodiments of the present invention, and the present invention is not intended to be limited to the configurations and the processing.

The invention claimed is:

1. An image forming apparatus that includes an image forming device that forms an image and performs printing on recording paper, the image forming apparatus comprising:

a human sensor that detects a person approaching the image forming apparatus;

a voice input device that receives an input of voice from a user;

a storage device that stores relationships between each keyword and operation mechanisms to be released from a predefined power saving state; and a control device that includes a processor and, through the processor executing a control program, acts as:

a receiver that receives a voice instruction based on the voice input to the voice input device; and a controller that executes a job in accordance with content of the voice instruction received by the receiver and brings a plurality of operation mechanisms provided in the image forming apparatus into the predefined power saving state, wherein in a case where the approaching person is detected by the human sensor when the image forming apparatus is in the power saving state, the controller brings the voice input device into a state where a voice input is possible, releases the operation mechanisms associated with a keyword indicated by the voice instruction received by the receiver from the power saving state and brings the operation mechanisms into an ordinary operating state, and causes the operation mechanisms not associated with the keyword indicated by the voice instruction to be maintained in the power saving state.

2. The image forming apparatus according to claim 1, wherein in a case where a condition that the detection of the approaching person continues for a predefined period of time is further satisfied in addition to a condition that the approaching person is detected by the human sensor, the controller brings the voice input device into a state where a voice input is possible.

3. The image forming apparatus according to claim 1, wherein in a case where the content of the voice instruction received by the receiver is associated with a plurality of functions, the controller releases the operation mechanisms necessary to execute the plurality of functions from the power saving state and brings the operation mechanisms into an ordinary operation state, and causes the operation mechanisms that are not necessary to execute the plurality of functions to be maintained in the power saving state.

4. An image forming apparatus that includes an image forming device that forms an image and performs printing on recording paper, the image forming apparatus comprising:

a human sensor that detects a person approaching the image forming apparatus;

a voice input device that receives an input of voice from a user; and a control device that includes a processor and, through the processor executing a control program, acts as:

a receiver that receives a voice instruction based on the voice input to the voice input device; and a controller that executes a job in accordance with content of the voice instruction received by the receiver and brings a plurality of operation mechanisms provided in the image forming apparatus into a predefined power saving state, wherein in a case where the approaching person is detected by the human sensor when the image forming apparatus is in the power saving state, the controller brings the voice input device into a state where a voice input is possible, releases the operation mechanisms necessary to execute functions associated with content indicated by the voice instruction received by the receiver from the power saving state and brings the operation mechanisms into an ordinary operating state, and causes the operation mechanisms necessary to execute functions that are not associated with the content indicated by the voice instruction to be maintained in the power saving state, wherein when state information indicating that a state of any mechanism part included in the image forming apparatus has changed is acquired, the controller releases the operation mechanisms necessary to execute functions for which the mechanism part is used from the power saving state and brings the operation mechanisms into an ordinary operation state, and causes the operation mechanisms that are not necessary to execute the function for which the mechanism part is used to be maintained in the power saving state.

5. The image forming apparatus according to claim 4, further comprising:

an operation device that receives an instruction input by an operation of the user;

wherein when state information indicating that a state of any mechanism part included in the image forming apparatus has changed is acquired, the controller releases an operation mechanism necessary to execute a function selected by a voice instruction input to the voice input device or an instruction received by the operation device from among the operation mechanisms necessary to execute a function for which the mechanism part is used from the power saving state and brings the operation mechanism into an ordinary operation state, and causes the operation mechanisms other than the operation mechanism necessary to execute the selected function to be maintained in the power saving state.

6. An image forming apparatus that includes an image forming device that forms an image and performs printing on recording paper, the image forming apparatus comprising:

a human sensor that detects a person approaching the image forming apparatus;

a voice input device that receives an input of voice from a user; and a control device that includes a processor and, through the processor executing a control program, acts as:

a receiver that receives a voice instruction based on the voice input to the voice input device; and a controller that executes a job in accordance with content of the voice instruction received by the receiver and brings a plurality of operation mechanisms provided in the image forming apparatus into a predefined power saving state, wherein in a case where the approaching person is detected by the human sensor when the image forming apparatus is in the power saving state, the controller brings the voice input device into a state where a voice input is possible, releases the operation mechanisms necessary to execute functions associated with content indicated by the voice instruction received by the receiver from the power saving state and brings the operation mechanisms into an ordinary operating state, and causes the operation mechanisms necessary to execute functions that are not associated with the content indicated by the voice instruction to be maintained in the power saving state, wherein when the receiver further receives the voice instruction related to favorite registration setting in which setting values that are different from default values are registered in advance, the controller releases the operation mechanisms necessary to execute functions to which the favorite registration setting is applied and brings the operation mechanisms into an ordinary operation state, and causes the operation mechanisms that are not necessary to execute the functions to be maintained in the power saving state.

\* \* \* \* \*